(12) United States Patent
Ramanathan et al.

(10) Patent No.: US 10,474,317 B2
(45) Date of Patent: Nov. 12, 2019

(54) DYNAMIC NODE GROUPING IN GRID-BASED VISUALIZATIONS

(71) Applicant: Oracle International Corporation, Redwood Shores, CA (US)

(72) Inventors: Jairam Ramanathan, Waltham, MA (US); Prashant Singh, Lexington, MA (US); Hugh Zhang, Winchester, MA (US); Mark Robertson, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 372 days.

(21) Appl. No.: 14/528,884

(22) Filed: Oct. 30, 2014

(65) Prior Publication Data

US 2015/0378556 A1 Dec. 31, 2015

Related U.S. Application Data

(60) Provisional application No. 62/017,213, filed on Jun. 25, 2014.

(51) Int. Cl.
*G06F 3/0481* (2013.01)
*G06F 16/26* (2019.01)
*G06F 3/0484* (2013.01)
*G06Q 10/00* (2012.01)

(52) U.S. Cl.
CPC ........ *G06F 3/04817* (2013.01); *G06F 3/0481* (2013.01); *G06F 3/04842* (2013.01); *G06F 3/04845* (2013.01); *G06F 16/26* (2019.01); *G06Q 10/00* (2013.01); *G06F 2203/04803* (2013.01); *G06F 2203/04806* (2013.01)

(58) Field of Classification Search
CPC ........ F25J 3/0209; F25J 1/0258; F25J 1/0022; F25J 3/0233; F25J 3/0257; F25J 1/0042; F25J 2215/04; F25J 2245/90; F25J 2210/06; F25J 2200/02; F25J 2230/42; F25J 2240/30; F25J 2245/42; C10L 3/10
See application file for complete search history.

(56) References Cited

U.S. PATENT DOCUMENTS

| | | | | |
|---|---|---|---|---|
| 5,040,131 | A | * 8/1991 | Torres | G06F 3/0481 715/210 |
| 5,414,809 | A | * 5/1995 | Hogan | G06F 3/0481 345/440 |
| 5,483,651 | A | * 1/1996 | Adams | G06F 17/245 |

(Continued)

*Primary Examiner* — Jung-Mu T Chuang
(74) *Attorney, Agent, or Firm* — Trellis IP Law Group, PC

(57) ABSTRACT

A grid-based visualization displays icons representing data entities in grid cells corresponding with the data entities' attribute values. Grid cells organize icons according to first and second attribute values of their data entities. Dynamic grouping replaces icons with summary icons based on one or more additional attributes of their data entities. Each summary icon represents one or more icons having matching values of their additional attributes. Summary icons may include sizing and visual indicators of aggregate values of the icons they replace. Summary icons may replace icons within a single cell or multiple cells. Summary icons may be positioned based on the positions of the icons they replace. User interface controls for activating and controlling grouping may be integrated with a legend.

20 Claims, 12 Drawing Sheets

(56) References Cited

U.S. PATENT DOCUMENTS

| | | | | |
|---|---|---|---|---|
| 5,764,873 A * | 6/1998 | Magid | | G06F 3/0486 |
| | | | | 715/769 |
| 6,003,034 A * | 12/1999 | Tuli | | G06F 17/30067 |
| 6,094,651 A * | 7/2000 | Agrawal | | G06F 17/30592 |
| 6,204,844 B1 * | 3/2001 | Fumarolo | | H04W 8/186 |
| | | | | 715/733 |
| 6,952,208 B1 * | 10/2005 | Arquie | | G06T 11/206 |
| | | | | 345/440 |
| 6,963,339 B2 * | 11/2005 | Leah | | G06T 11/40 |
| | | | | 345/440 |
| 6,983,424 B1 * | 1/2006 | Dutta | | G06F 3/04817 |
| | | | | 715/790 |
| 7,096,422 B2 * | 8/2006 | Rothschiller | | G06F 17/2247 |
| | | | | 707/E17.125 |
| 7,263,670 B2 * | 8/2007 | Rekimoto | | G06F 9/4443 |
| | | | | 715/764 |
| 7,302,649 B2 * | 11/2007 | Ohnishi | | G06F 3/04817 |
| | | | | 715/769 |
| 7,383,503 B2 * | 6/2008 | Banks | | G06F 3/0481 |
| | | | | 707/999.003 |
| 7,451,436 B2 * | 11/2008 | Walpole | | G06F 8/34 |
| | | | | 717/107 |
| 7,461,077 B1 * | 12/2008 | Greenwood | | G06F 3/0482 |
| 7,533,056 B2 * | 5/2009 | Friesen | | G06Q 20/10 |
| | | | | 345/440.2 |
| 7,797,621 B1 * | 9/2010 | Danner | | G06F 17/246 |
| | | | | 715/220 |
| 7,814,407 B1 * | 10/2010 | Danner | | G06F 17/246 |
| | | | | 715/213 |
| 7,870,509 B2 * | 1/2011 | Cao | | G06F 9/4443 |
| | | | | 715/765 |
| 8,108,241 B2 * | 1/2012 | Shukoor | | G06Q 10/06 |
| | | | | 705/7.27 |
| 8,156,421 B2 * | 4/2012 | Chhajer | | G06F 17/30306 |
| | | | | 715/227 |
| 8,166,385 B2 * | 4/2012 | Garcia-Molina | | G06F 17/2258 |
| | | | | 715/220 |
| 8,286,100 B2 * | 10/2012 | Helfman | | G06F 3/0481 |
| | | | | 715/855 |
| 8,352,465 B1 * | 1/2013 | Jing | | G06F 17/30867 |
| | | | | 707/723 |
| 8,402,382 B2 * | 3/2013 | Agarawala | | G06F 3/0483 |
| | | | | 345/173 |
| 8,504,935 B2 * | 8/2013 | Stallings | | G06F 3/04817 |
| | | | | 715/778 |
| 8,640,056 B2 * | 1/2014 | Helfman | | G06F 17/30572 |
| | | | | 715/854 |
| 8,762,885 B2 * | 6/2014 | Hwang | | G06F 3/04817 |
| | | | | 715/835 |
| 8,910,084 B2 * | 12/2014 | Helfman | | G06T 11/206 |
| | | | | 715/854 |
| 8,947,437 B2 * | 2/2015 | Garr | | G06T 11/206 |
| | | | | 345/440 |
| 9,123,161 B2 * | 9/2015 | Adair | | G06T 19/00 |
| 9,158,743 B1 * | 10/2015 | Kraemer | | G06F 17/212 |
| 9,423,934 B2 * | 8/2016 | Kim | | G06F 3/0481 |
| 9,449,408 B2 * | 9/2016 | Benson | | G06T 11/206 |
| 9,582,573 B2 * | 2/2017 | Im | | G06F 16/34 |
| 9,600,158 B2 * | 3/2017 | Temkin | | G06F 3/04845 |
| 9,639,889 B2 * | 5/2017 | Babiarz | | G06Q 30/0643 |
| 9,761,036 B2 * | 9/2017 | Rzeszotarski | | G06T 13/20 |
| 9,791,996 B2 * | 10/2017 | Kim | | G06F 3/0481 |
| 2001/0049695 A1 * | 12/2001 | Chi | | G06F 17/246 |
| 2002/0167546 A1 * | 11/2002 | Kimbell | | G06F 3/0483 |
| | | | | 715/790 |
| 2004/0168115 A1 * | 8/2004 | Bauernschmidt | | G06F 17/2241 |
| | | | | 715/238 |
| 2004/0212615 A1 * | 10/2004 | Uthe | | G06T 11/206 |
| | | | | 345/440 |
| 2005/0060665 A1 * | 3/2005 | Rekimoto | | G06F 9/4443 |
| | | | | 715/810 |
| 2005/0066292 A1 * | 3/2005 | Harrington | | G06F 3/0483 |
| | | | | 715/835 |
| 2005/0219268 A1 * | 10/2005 | Kyle | | G08G 1/096811 |
| | | | | 345/660 |
| 2005/0283742 A1 * | 12/2005 | Gusmorino | | G06F 3/04817 |
| | | | | 715/839 |
| 2006/0082592 A1 * | 4/2006 | Black-Ziegelbein | | |
| | | | | G06T 11/206 |
| | | | | 345/605 |
| 2006/0101134 A1 * | 5/2006 | Nocera | | H04L 41/0893 |
| | | | | 709/223 |
| 2006/0112123 A1 * | 5/2006 | Clark | | G06F 17/246 |
| 2006/0161868 A1 * | 7/2006 | Van Dok | | G06F 3/0481 |
| | | | | 715/835 |
| 2006/0179032 A1 * | 8/2006 | Gottsman | | G06F 17/30696 |
| 2006/0265318 A1 * | 11/2006 | Friesen | | G06Q 20/10 |
| | | | | 705/37 |
| 2006/0277496 A1 * | 12/2006 | Bier | | G06T 11/206 |
| | | | | 715/810 |
| 2008/0033777 A1 * | 2/2008 | Shukoor | | G06Q 10/06 |
| | | | | 705/7.11 |
| 2008/0288889 A1 * | 11/2008 | Hunt | | G06Q 30/02 |
| | | | | 715/810 |
| 2008/0307335 A1 * | 12/2008 | Chaudhri | | G06F 3/0482 |
| | | | | 715/764 |
| 2009/0013271 A1 * | 1/2009 | Helfman | | G06F 17/30572 |
| | | | | 715/764 |
| 2009/0013281 A1 * | 1/2009 | Helfman | | G06F 17/30572 |
| | | | | 715/788 |
| 2009/0013287 A1 * | 1/2009 | Helfman | | G06T 11/206 |
| | | | | 715/853 |
| 2009/0132942 A1 * | 5/2009 | Santoro | | G06F 3/0481 |
| | | | | 715/765 |
| 2009/0282352 A1 * | 11/2009 | Solanki | | G06F 3/04817 |
| | | | | 715/765 |
| 2009/0300480 A1 * | 12/2009 | Cohen | | G11B 27/034 |
| | | | | 715/234 |
| 2009/0313304 A1 * | 12/2009 | Goodger | | G06F 17/30896 |
| 2009/0319314 A1 * | 12/2009 | Good | | G06Q 20/10 |
| | | | | 705/329 |
| 2009/0327854 A1 * | 12/2009 | Chhajer | | G06F 17/30306 |
| | | | | 715/227 |
| 2010/0017885 A1 * | 1/2010 | Cohen | | G06Q 30/0276 |
| | | | | 726/26 |
| 2010/0058163 A1 * | 3/2010 | Garcia-Molina | | G06F 17/2258 |
| | | | | 715/220 |
| 2010/0058215 A1 * | 3/2010 | Chung | | G06F 3/04817 |
| | | | | 715/769 |
| 2010/0154065 A1 * | 6/2010 | Cohen | | G11B 27/036 |
| | | | | 726/28 |
| 2010/0162108 A1 * | 6/2010 | Stallings | | G06F 3/04817 |
| | | | | 715/702 |
| 2011/0055722 A1 * | 3/2011 | Ludwig | | G06F 3/04847 |
| | | | | 715/751 |
| 2011/0066933 A1 * | 3/2011 | Ludwig | | G06F 17/246 |
| | | | | 715/212 |
| 2011/0126156 A1 * | 5/2011 | Krishnaraj | | G06F 3/016 |
| | | | | 715/828 |
| 2012/0137238 A1 * | 5/2012 | Abeln | | G06F 3/04847 |
| | | | | 715/771 |
| 2012/0151393 A1 * | 6/2012 | Arndt | | G06F 16/288 |
| | | | | 715/765 |
| 2012/0221974 A1 * | 8/2012 | Trotta | | G06F 3/0485 |
| | | | | 715/823 |
| 2012/0229466 A1 * | 9/2012 | Riche | | G06F 16/9038 |
| | | | | 345/440 |
| 2012/0314026 A1 * | 12/2012 | Chen | | H04N 19/159 |
| | | | | 348/43 |
| 2013/0031497 A1 * | 1/2013 | Arrasvuori | | G06F 3/0482 |
| | | | | 715/764 |
| 2013/0091437 A1 * | 4/2013 | Ludwig | | G06K 9/00355 |
| | | | | 715/751 |
| 2013/0120379 A1 * | 5/2013 | Adair | | G06T 19/00 |
| | | | | 345/420 |
| 2013/0125002 A1 * | 5/2013 | Spaeth | | G06F 3/0482 |
| | | | | 715/731 |

(56) References Cited

U.S. PATENT DOCUMENTS

| | | | |
|---|---|---|---|
| 2013/0152018 A1* | 6/2013 | Chuang | G06F 3/0488 715/823 |
| 2014/0047382 A1* | 2/2014 | Kim | G06F 3/0481 715/800 |
| 2014/0250376 A1* | 9/2014 | Jojic | G06F 17/30716 715/273 |
| 2015/0106760 A1* | 4/2015 | Axelsson | G06F 3/0481 715/781 |
| 2015/0169178 A1* | 6/2015 | Wang | G06F 3/04817 715/765 |
| 2015/0169179 A1* | 6/2015 | Wang | G06F 17/30 715/835 |
| 2015/0170333 A1* | 6/2015 | Jing | G06T 3/40 345/660 |
| 2015/0286342 A1* | 10/2015 | MacArthur | G06F 3/0481 715/783 |
| 2016/0021179 A1* | 1/2016 | James | G06F 3/04817 709/204 |
| 2016/0041727 A1* | 2/2016 | Choi | G06F 3/04842 715/835 |
| 2016/0142488 A1* | 5/2016 | Adler | G06F 17/246 709/217 |

* cited by examiner

DYNAMIC NODE GROUPING IN GRID-BASED VISUALIZATIONS

CROSS REFERENCES TO RELATED APPLICATIONS

This application claims priority from U.S. Provisional Patent Application Ser. No. 62/017,213, entitled MAINTAINING CONTEXT FOR MAXIMIZE INTERACTIONS ON GRID-BASED VISUALIZATIONS, filed on Jun. 25, 2014, which is hereby incorporated by reference as if set forth in full in this application for all purposes.

This application is related to the following application, U.S. patent application Ser. No. 14/528,629, entitled MAINTAINING CONTEXT FOR MAXIMIZE INTERACTIONS ON GRID-BASED VISUALIZATIONS, filed on Oct. 30, 2014, which is hereby incorporated by reference, as if set forth in full in this specification:

BACKGROUND

This invention relates to the field of user interfaces for visualizing, interacting with, and creating or modifying data. Grid-based views are often used to display information across two dimensions represented by grid cells arranged into one or more rows and columns. Grid-based views may include any number of grid cells in any M row by N column arrangement, where M and N are arbitrary positive integers. Each grid cell may include zero, one, or more icons, text entities, numbers, images, symbols, or other visual information, referred to generally herein as icons. Icons are generally displayed in grid cells to indicate relationships between corresponding items of data and the attributes associated with the grid's dimensions.

For example, a grid-based view might display icons representing employees in a company with one dimension representing employee ability and the other representing employee performance. Each cell in this example grid-based view represents a different combination of employee ability and performance values, and each cell contains icons representing the employees having ability and performance values associated with that cell.

One problem with grid-based visualizations is that the cells in grid-based visualizations often contain more icons than can be displayed in a space-constrained visualization. In space constrained scenarios, the amount of space allotted to an individual row, column, or cell may limit the amount of information that can be displayed for that particular section of the grid. The most common approach to this problem is to simply zoom the entire grid within a scrollable region, allowing the user to view more details about the section of the grid that is currently within the scrolled viewport. However, zooming into a portion of a grid makes it difficult for users to perceive the relationship between the enlarged portion of the grid with respect to the whole grid.

To address this issue of providing context, prior approaches may utilize an overview window that displays a diagram of the current zoomed view in relation to the whole view. However, even with an overview window, areas outside of the scrolled viewport are completely missing from view; all of the associated information is hidden from the user; and the user is unable to interact with these areas without scrolling them into view.

Another problem arising with space-constrained visualizations is that it is often not possible to display all of the icons placed in a grid cell or other collection or grouping at once in the space allotted for the grid cell. Prior visualizations have not been able to elegantly handle the "overflow" of icons for each cell and provide users access to their contents.

Prior visualizations often have two problems: inelegant ways to alert the user that an overflow of icons has occurred and visualizations and interfaces to the overflowed icons that are often not well integrated into the base visualization. An example of the former is simply relying on a label indicating the total count of icons within a cell and relying on the user to notice that the number of rendered icons is fewer than this number. Even a label that more explicitly indicates that a subset of icons is being rendered has the shortcoming that users often treat labels as secondary indicators in visual components. An example of the latter problem is typically directing the user to a completely separate view (e.g. a scrollable table) that contains the full set of icons, that may take the user out of context.

Even in cases where all of the icons do fit inside the on-screen space of their grid cell, it is sometimes desirable to group these individual icons into summary or group icons to provide the end user with useful aggregate information about their data.

Prior approaches to this problem typically have a few drawbacks. It is very common for the grouping to be built in to the component by the visualization designer. This is useful for giving the end user an initial summary view, but is also limiting because the end user has no control over the grouping criteria. If the user is given any control over the grouping, this is often done via controls outside of the visualization, which can be disorienting for the user. Lastly, there may not be any access to the individual icons that comprise the summary icon, except in a separate detail view, which again takes the user out of context.

Therefore, there is an unmet need for improvements to grid-based visualizations to view the icons in grid cells in detail; handling overflow when there are more icons in a grid cell than can be displayed in the allocated on-screen space; and grouping icons in grid cells to provide users with useful aggregate information.

SUMMARY

Embodiments of the invention also provide dynamic grouping functionality directly to the end user by integrating it into the visualization's legend. The legend typically denotes varies categories that apply to the node and their corresponding visual attributes.

In an embodiment, these categories can be reused as the superset of categories that the user can select to group nodes. In one embodiment of an integrated legend control, the user can select one or more categories on the legend as the grouping criteria, and, in response, the visualization replaces nodes matching the selected categories with summary nodes for each unique tuple of categories. (In this implementation, each summary node represents of a tuple including the values of the two attribute dimensions of the grid visualization and a selected category or set of categories.) In a further embodiment, a user interface control, for example in the legend, allows the user to toggle whether the grouping is done within each grid cells or across the entire grid and to enable filtering of icons from the grid-based visualization.

For summary nodes representing nodes in a single cell, embodiments of the invention may display a summary node in its corresponding grid cell. For summary nodes representing nodes across multiple grid cells, an embodiment of the invention may display summary nodes overlapping the boundaries of the corresponding cells. A further embodiment may position summary nodes to overlap multiple grid cells in proportion to each cells contribution of nodes to the summary group. For example, a summary node's position may be based on a weighted average of the positions of the nodes in that grouping.

Additional embodiments of the invention may visualize groupings of nodes in the form of icons, symbols, text, numbers, images, charts (e.g. bar chart, pie chart, treemap), or any other type of visual indicator. In still other embodiments, the size of the summary node is based on the number of nodes it replaces.

In still another embodiment, a user interface provided to the end user (e.g. on double-click) makes it possible to drill from the summary node into a display of all of the individual nodes that the summary node represents.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

In the drawings, identical reference numbers indicate identical elements.

DETAILED DESCRIPTION OF EMBODIMENTS

Figure 1:
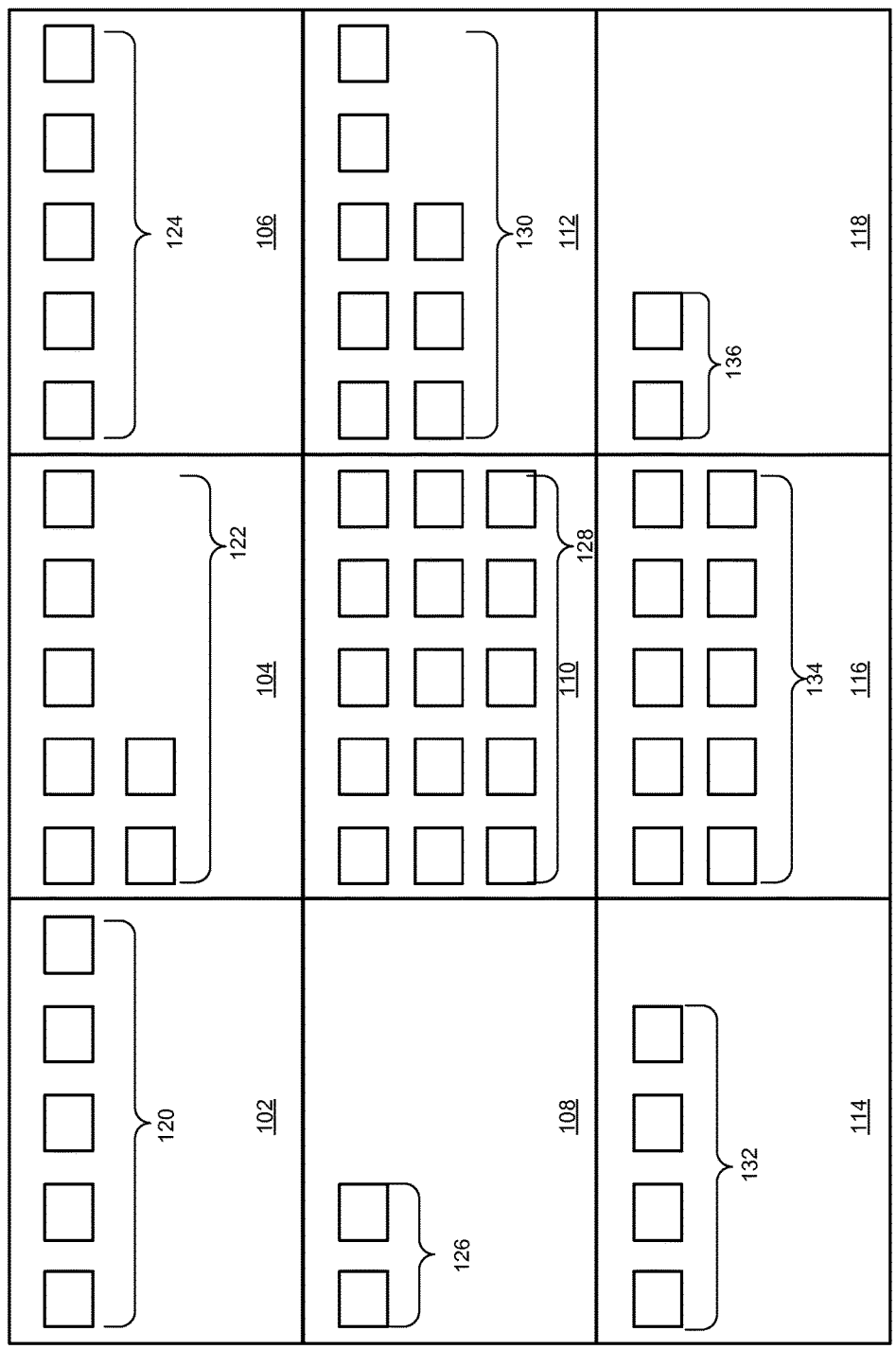
FIG. 1 illustrates an example grid-based visualization suitable for utilizing embodiments of the invention.

FIG. 1 illustrates an example grid-based visualization 100 suitable for utilizing embodiments of the invention. Example grid-based visualization 100 is partitioned into three rows and three columns, forming cells 102, 104, 106, 108, 110, 112, 114, 116, and 118; however, embodiments of the invention may be utilized with any arbitrary number of cells arranged into any possible combination of rows and columns.

Each of the cells 102-118 optionally contains a set of icons. For example, cells 102, 104, 106, 108, 110, 112, 114, 116, and 118 include icon sets 120, 122, 124, 126, 128, 130, 132, 134, and 136, respectively. Each of the icons represents a data entity, for example a record of an employee or product. Embodiments of the invention may be applied to data entities of any type, representing any type of physical or abstract entity that users may wish to compare or evaluate. Each cell may include zero or any arbitrary number of icons. Users may select, move, or otherwise interact with icons to reveal additional information and/or manipulate attributes of the corresponding data entity. Additionally, users may drag icons from one cell to another to change the corresponding data entity's attribute values to match those assigned to the destination cell.

In an embodiment, the horizontal and vertical axes of the grid-based visualization 100 are assigned to different attributes of the data entities, and each cell represents a pair or range of values for these two attributes. For example, the horizontal axis may be assigned to a product price attribute and the vertical axis may be assigned to a product performance attribute. In this example, each grid cell represents a specific pair of attribute values or a range of values for these two attributes. In another example, the horizontal and vertical axes may be assigned to employee performance and ability attributes, so as to help managers compare and visualize an organization's human resources.

In an embodiment, icons are dynamically sized such that each cell can display all of the icons matching that cell's attribute values and that each icon is as large as possible, so as to present as much information to the user as possible. However, if a cell's icon set is very large, this may result in very small icons that are difficult to read. Therefore, a further embodiment of the invention also limits the icons in a cell to a minimum icon size or larger. As discussed in detail below, embodiments of the invention may include selective zooming and overflow features to show large numbers of icons when there is insufficient room in a cell to display all of the icons in a set.

Figure 2A:
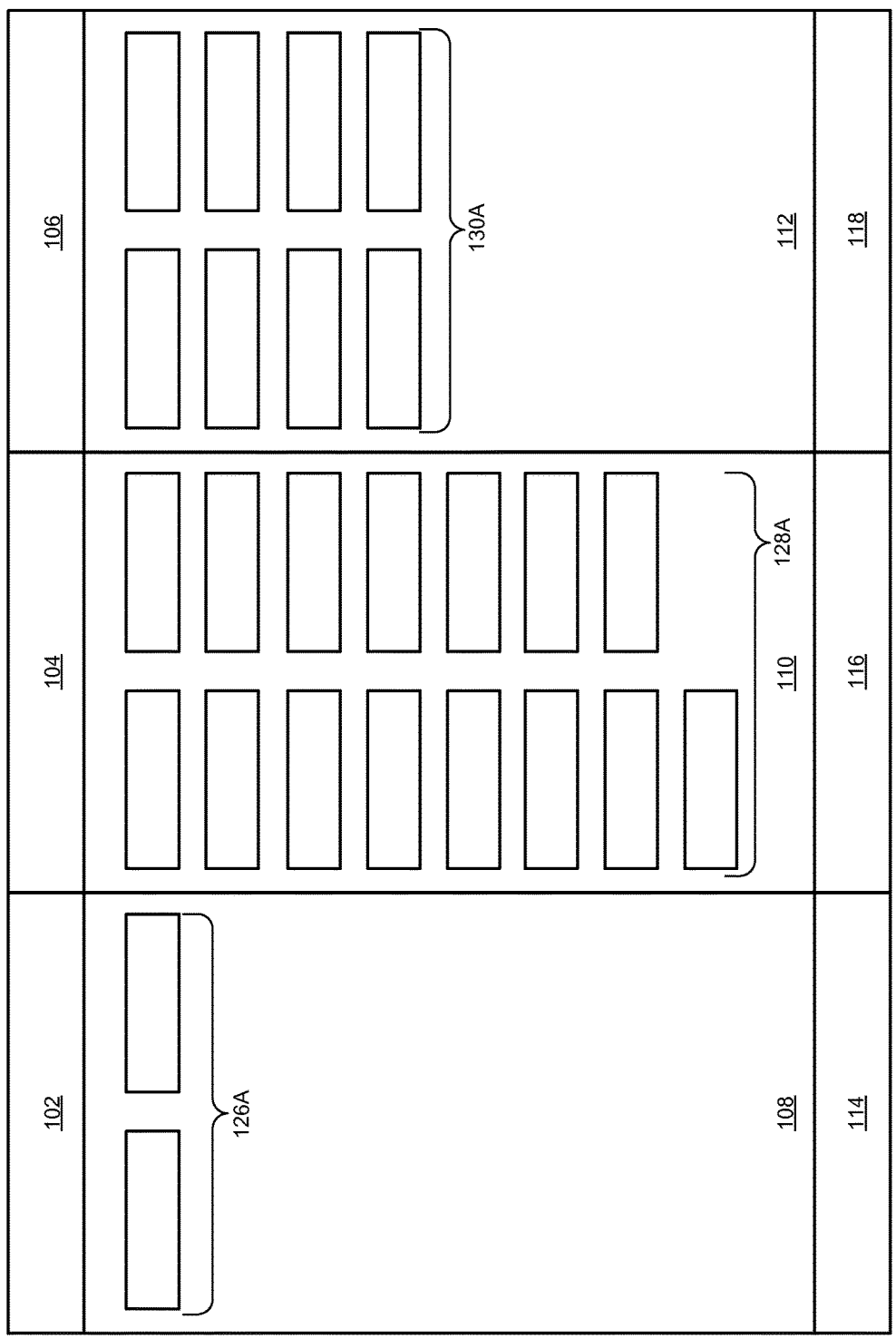
FIGS. 2A-2C illustrate examples of selective zooming on grid-based visualizations according to embodiments of the invention.
Figure 2B:
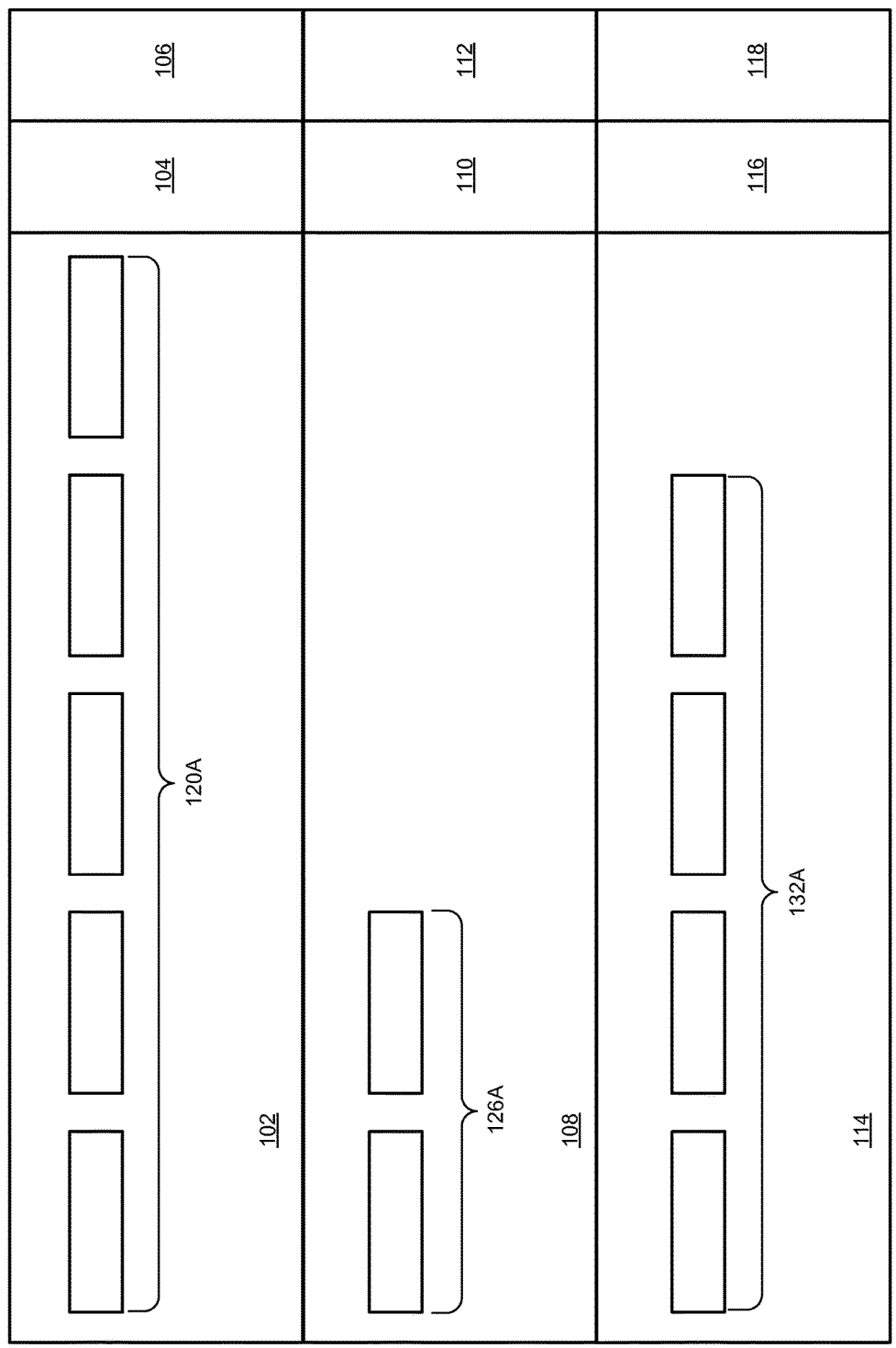
Figure 2C:
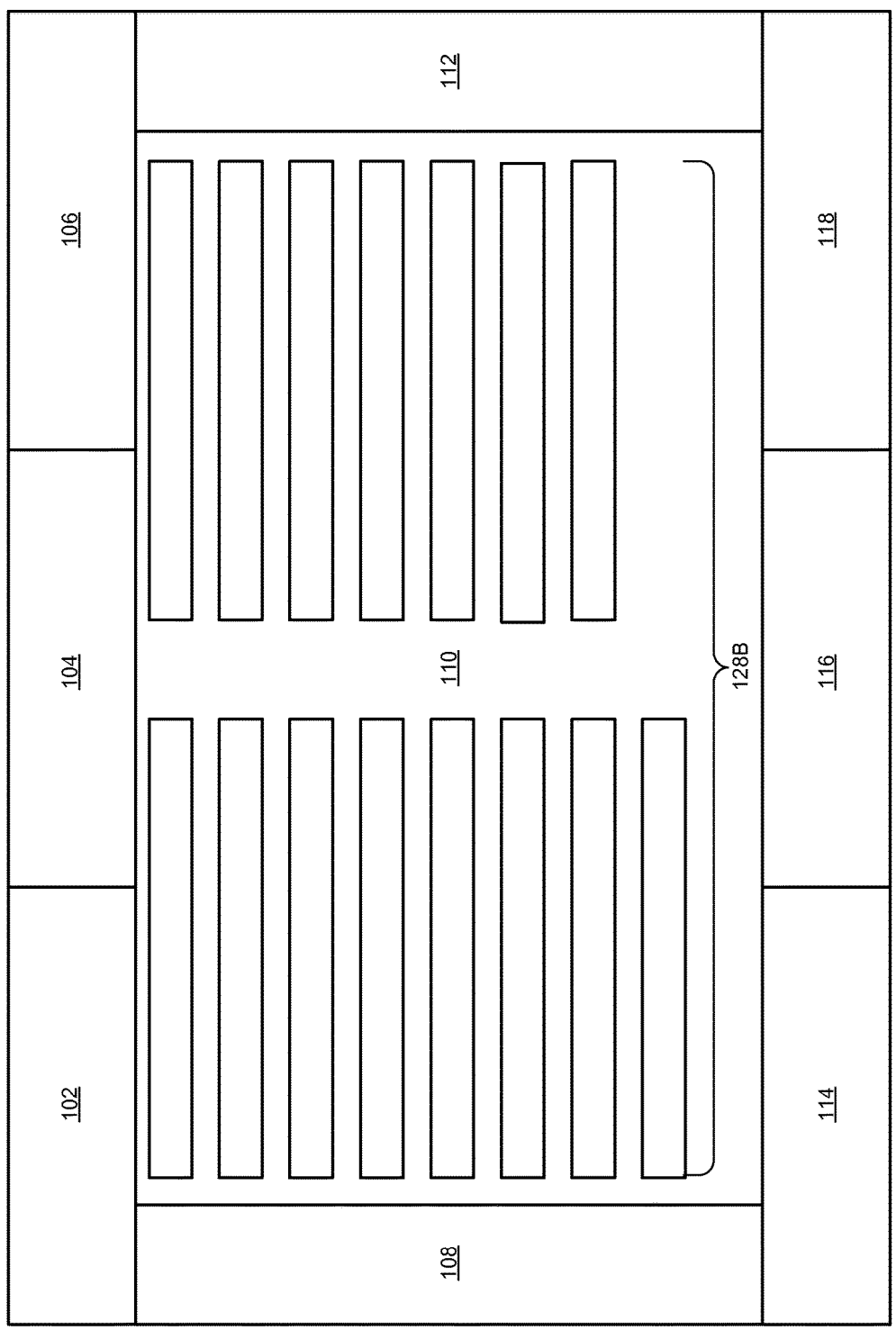

Embodiments of the invention include a selective zooming functionality for displaying more information per icon and/or more icons per cell in a grid-based visualization. FIGS. 2A-2C illustrate examples of selective zooming on grid-based visualizations according to embodiments of the invention. FIG. 2A illustrates an example row-based selective zoom on a grid-based visualization 200. A user selects a row of the grid-based visualization for zooming. In response, the icon sets in cells in the unselected rows are removed from view and all of the unselected rows are minimized. The selected row and its icon sets are enlarged to take the space left open by the minimized rows.

In this example, a user selects the center row for selective zooming. In response, the cells 102, 104, 106, 114, 116, and 118 are vertically minimized and their icon sets are removed. Cells 108, 110, and 112 in the selected row are enlarged, and the icons in their icon sets are enlarged to form icon sets 126A, 128A, and 130A, which are now large enough to convey additional information.

In an embodiment, the minimized cells remain visible in the selectively zoomed grid-based visualization 200 so as to provide context for the selected row's position with respect to the grid-based visualization as a whole. In a further embodiment, each of the minimized cells may include one or more summary icons or other indicators to provide aggregate information about the icon sets associated with minimized cells. For example, each minimized cell may include a summary icon indicating the number of icons in its icon set.

FIG. 2B illustrates an example column-based selective zoom on a grid-based visualization 230. A user selects a column of the grid-based visualization for zooming. In response, the icon sets in cells in the unselected columns are removed from view and all of the unselected columns are minimized. The selected column and its icon sets are enlarged to take the space left open by the minimized rows.

In a further embodiment, cell labels may be rotated 90 degrees to more efficiently use the horizontal space.

In this example, a user selects the left column for selective zooming. In response, the cells 104, 106, 110, 112, 116, and 118 are horizontally minimized and their icon sets are removed. Cells 102, 108, and 114 in the selected column are enlarged, and the icons in their icon sets are enlarged to form icon sets 120A, 126A, and 132A, which are now large enough to convey additional information.

In an embodiment, the minimized cells remain visible in the selectively zoomed grid-based visualization 230 so as to provide context for the selected column's position with respect to the grid-based visualization as a whole. In a further embodiment, each of the minimized cells may include one or more summary icons or other indicators to provide aggregate information about the icon sets associated with minimized cells. For example, each minimized cell may include a summary icon indicating the number of icons in its icon set.

FIG. 2C illustrates an example cell-based selective zoom on a grid-based visualization 260. A user selects a cell of the grid-based visualization for zooming. In response, the icon sets in unselected cells are removed from view and the unselected cells are minimized. The selected cell and its icon set is enlarged to take the space left open by the other minimized cells.

In this example, a user selects the center cell 110 for selective zooming. In response, the cells 102, 104, 106, 108, 112, 114, 116, and 118 are horizontally or vertically minimized and their icon sets are removed. Selected cell 110 is enlarged, and the icons in its icon sets are enlarged to form enlarged icon set 128B, which are now large enough to convey additional information.

In an embodiment, the minimized cells remain visible in the selectively zoomed grid-based visualization 260 so as to provide context for the selected cell's position with respect to the grid-based visualization as a whole. In a further embodiment, each of the minimized cells may include one or more summary icons or other indicators to provide aggregate information about the icon sets associated with minimized cells. For example, each minimized cell may include a summary icon indicating the number of icons in its icon set.

Embodiments of the invention activate and deactivate the selective zooming on rows, columns, and/or individual cells via any type of user input, including graphical user interface buttons and mouse or touch inputs or gestures. For example, double-tapping on a specific row header, column header, or cell will initiate a selective zoom on the selected row, column, or cell, respectively. Additionally, embodiments of the invention may utilize animations and other visual effects, including scaling, panning, zooming, scrolling, cross-fades, and color changes, to emphasize aspects of the grid-based visualization when transitioning between the default and selective zoom views.

As shown in FIGS. 2A-2B, the selective zoom enlarges some of the icon sets to present additional information for the corresponding data items. Unfortunately, sometimes there are more icons in a data set than can be displayed in a cell of a grid-based visualization, especially if the icon size is restricted to a minimum icon size or larger. In these situations, embodiments of the invention may use an overflow indicator to indicate the existence of additional icons (and corresponding data items) associated with a cell of a grid-based visualization.

Figure 3:
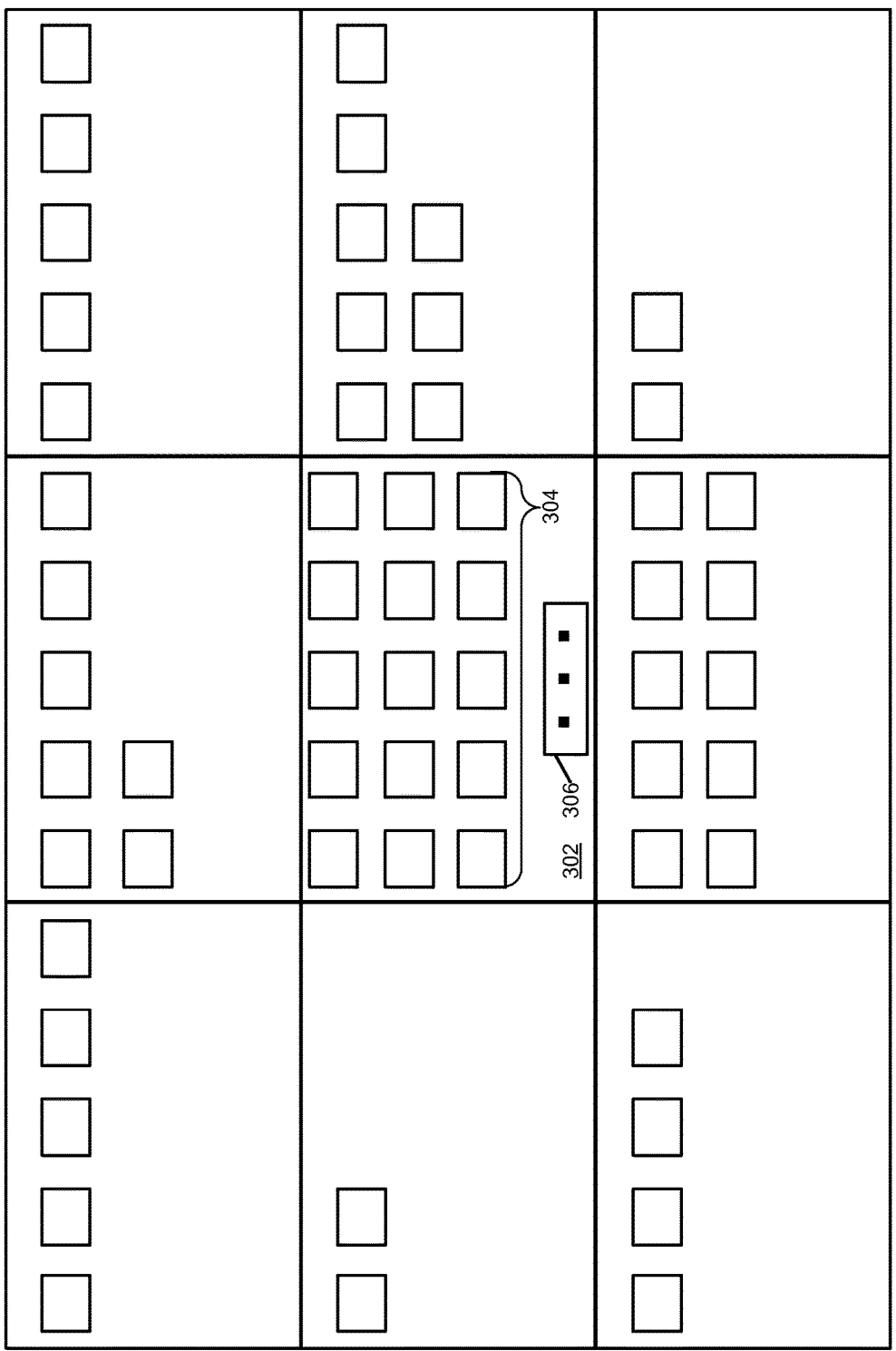
FIG. 3 illustrates an example overflow indicator in a grid-based visualization according to an embodiment of the invention.

FIG. 3 illustrates an example overflow indicator in a grid-based visualization 300 according to an embodiment of the invention. Example grid-based visualization 300 includes a cell 302 and visible icon set 304. In this example, there are more icons than can be displayed at one time in cell 302. Overflow indicator 306 indicates to users that there are additional icons in cell 302 that cannot be displayed within the space allocated. In response, a user may choose to activate the selective zoom of a cell, row, or column to increase the screen space allocated to cell 302. In an embodiment, when the selective zoom is activated on a cell, the icon sets are enlarged to a least a second minimum icon size, which is larger than the minimum icon size in the unzoomed view of the grid-based visualization. If there are still too many icons to fit in the zoomed cell, then a further embodiment of the invention may allow users to scroll the contents of the zoomed cell vertically and/or horizontally to view additional icons.

In a further embodiment, if the user has specified a search or filtering criteria, then icons matching the criteria will be arranged at the beginning of an icon set, so as to prioritize the visualization of icons relevant to the user's criteria.

Figure 4:
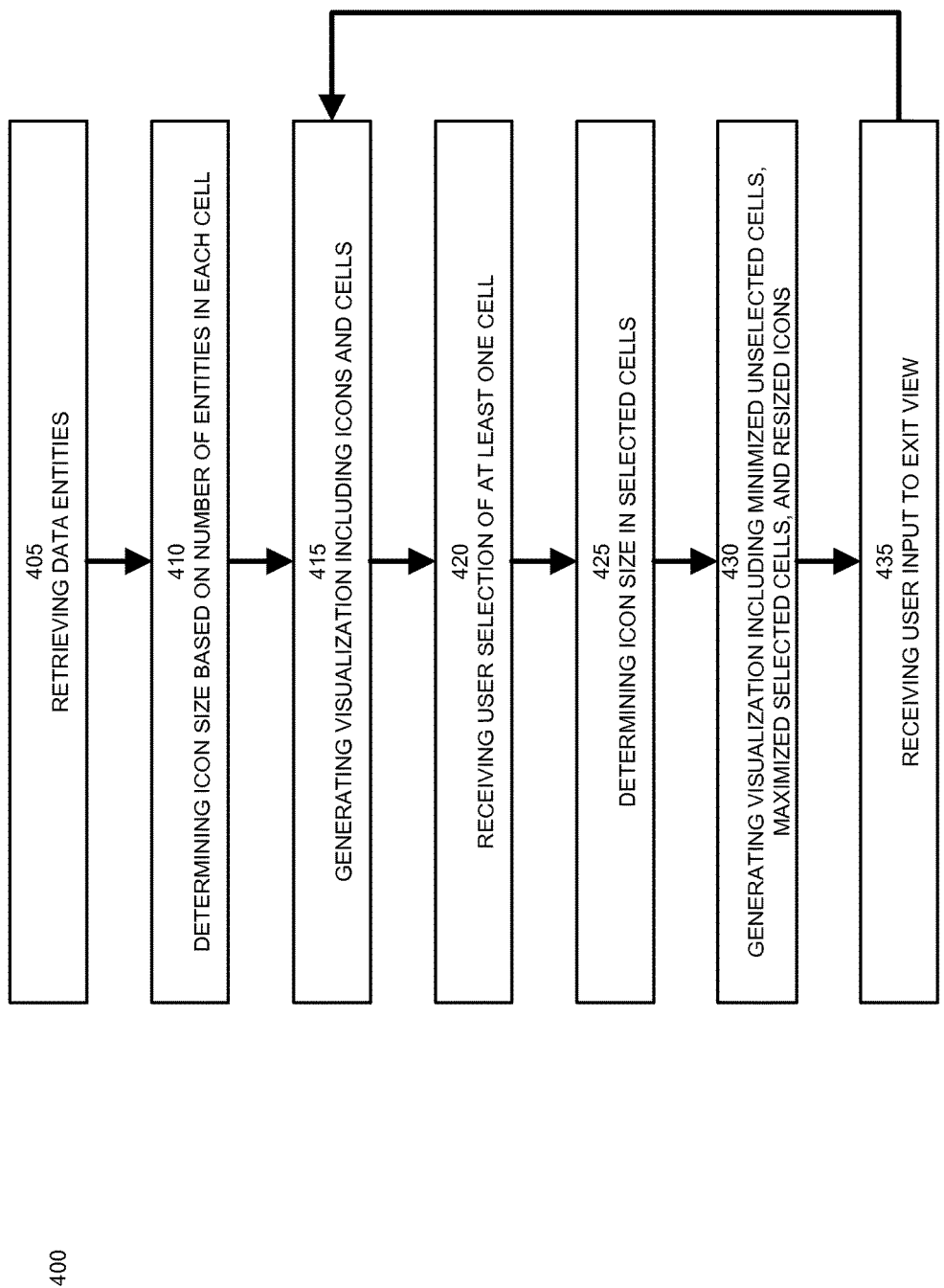
FIG. 4 illustrates a method of generating grid-based visualizations according to an embodiment of the invention.

FIG. 4 illustrates a method 400 of generating grid-based visualizations according to an embodiment of the invention. Step 405 retrieves one or more data entities to be displayed in a grid-based visualization. In an embodiment, step 405 retrieves data entities from a database or other data storage system. Step 405 may retrieve data entities matching criteria specified by a user and/or a visualization application. In one embodiment, step 405 retrieves data entities matching criteria for any cell in the grid-based visualization, and then assigns each data entity to a cell based on two or more data entity attribute values associated with the dimensions of the grid-based visualization. In another embodiment, step 405 retrieves data entities using criteria or database queries specific to each cell of the grid-based visualization.

Step 410 determines an icon size to represent each of the retrieved data entities. An embodiment of step 410 assumes that icons have a fixed height and variable icon width between a minimum and maximum value. This embodiment of step 410 lays out the icons in a grid layout within the cell bounds. The algorithm first calculates the maximum number of rows that will fit (maximumRows=floor(cellHeight/iconHeight)) and the maximum number of columns that will fit (maximumColumns=floor(cellWidth/minimumIconWidth)).

If maximumRows*maximumColumns is less than the number of icons assigned to a cell, an overflow is required and the iconWidth is set to cellWidth/maximumColumns. Otherwise, overflow is not required and an embodiment of the invention determines the largest iconWidth that will not trigger overflow. For example, this may be done by determining the optimal number of columns, starting by setting a variable testColumns to maximumColumns and decrementing from there. For each value of testColumns, if testColumns*maximumRows<iconCount, then overflow has occurred and the current value of testColumns+1 is the optimal number of columns. Alternatively, if cellWidth/testColumns>maximumIconWidth, the grid visualization can display all icons at their maximum width, so testColumns is the optimal number of columns. Then, the optimal icon width is cellWidth/optimalColumns. If after applying the above sizing algorithm, overflow still occurs, the last icon in the grid layout may be replaced with an interactive overflow indicator.

Step 415 generates a grid-based visualization including cells arranged in rows and columns and icon sets representing data entities. Step 415 may also generate other user interface elements, such as selective zoom controls, legends, and filter controls. In an embodiment, step 415 generates markup language code, styling elements, scripting code, data corresponding with attributes of the data entities, and any other content assets required to display and optionally enable user interaction with the grid-based visualization. This embodiment then forwards this generated code and data to a client application for processing to implement and display the grid-based visualization. In an example of this embodiment, the generated code and data may include web markup, code, and other content assets adapted to be displayed on a client web browser. In another embodiment, step 415 displays the grid-based visualization to users and implements the user interface.

Step 420 receives a user selection of at least one cell of the grid-based visualization for selective zooming. Embodiments of step 420 may receive a selection of a single cell, a row, a column, or any other arbitrary collection of cells in the grid-based visualization.

Step 425 then determines the icon size in the selectively zoomed cells. In an embodiment, icons are set to their maximum size in zoomed views because space is unlimited through the use of scrolling.

Step 430 generates the selectively zoomed grid-based visualization. In an embodiment, the unselected cells are set to a minimum height and/or width and their icon sets are removed from view. The one or more selected cells are enlarged to occupy the space vacated by the minimized unselected cells. The icons associated with selected cell(s) are enlarged to the size specified in step 425. In an embodiment, step 430 also adds or enables horizontal and/or vertical scrolling to selected cells to allow users to view and access the entire icon set associated with each cell, regardless of the number of icons and the icon size. In a further embodiment, step 430 specifies animation data for visually transitioning between the normal and selectively zoomed grid-based visualization.

In an embodiment, step 430 generates markup language code, styling elements, scripting code, data corresponding with attributes of the data entities, and any other content assets required to display and optionally enable user interaction with the grid-based visualization. This embodiment then forwards this generated code and data to a client application for processing to implement and display the grid-based visualization. In an example of this embodiment, the generated code and data may include web markup, code, and other content assets adapted to be displayed on a client web browser. In another embodiment, step 430 displays the grid-based visualization to users and implements the user interface.

Step 435 receives a user input indicating a desire to transition from the selectively zoomed grid-based visualization back to the unzoomed grid-based visualization. In response, method 400 returns to step 415 to generate a new view of the unzoomed grid-based visualization. In an embodiment, subsequent iterations of step 415 may generate animation data for visually transitioning between the selectively zoomed and normal grid-based visualization.

Figure 5A:
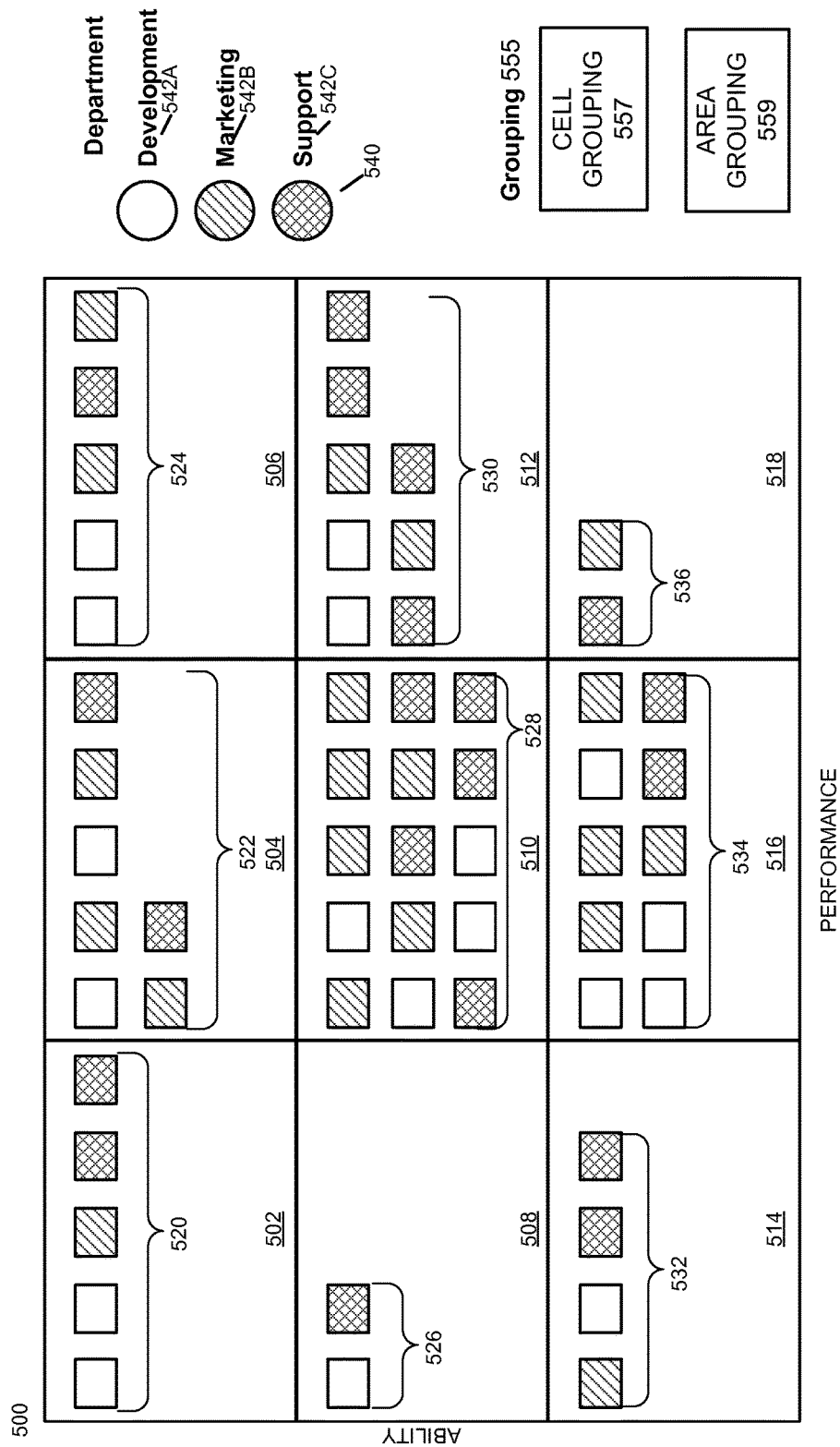
FIGS. 5A-5C illustrate example grouping functionality in grid-based visualizations according to embodiments of the invention.
Figure 5B:
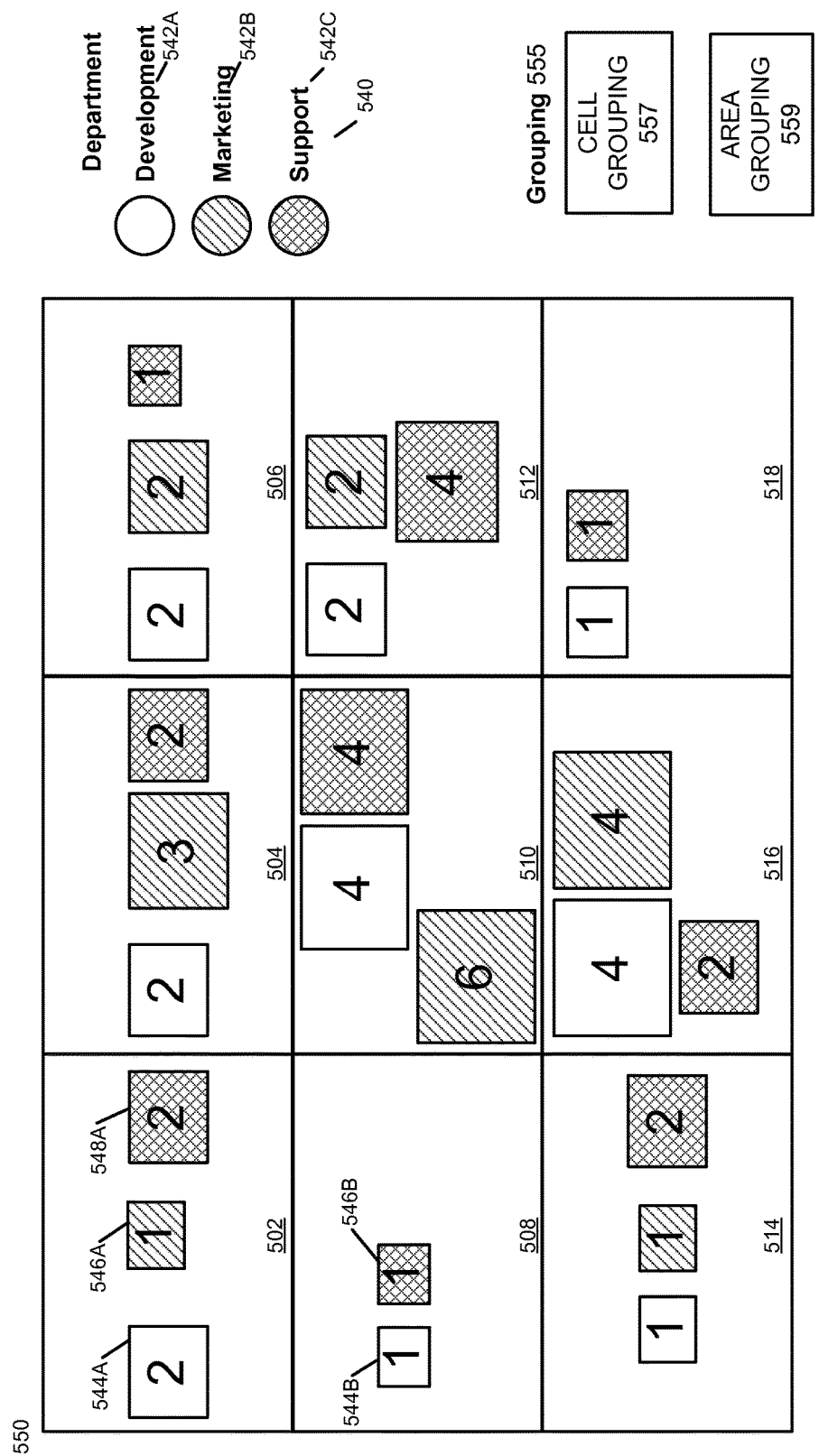
Figure 5C:
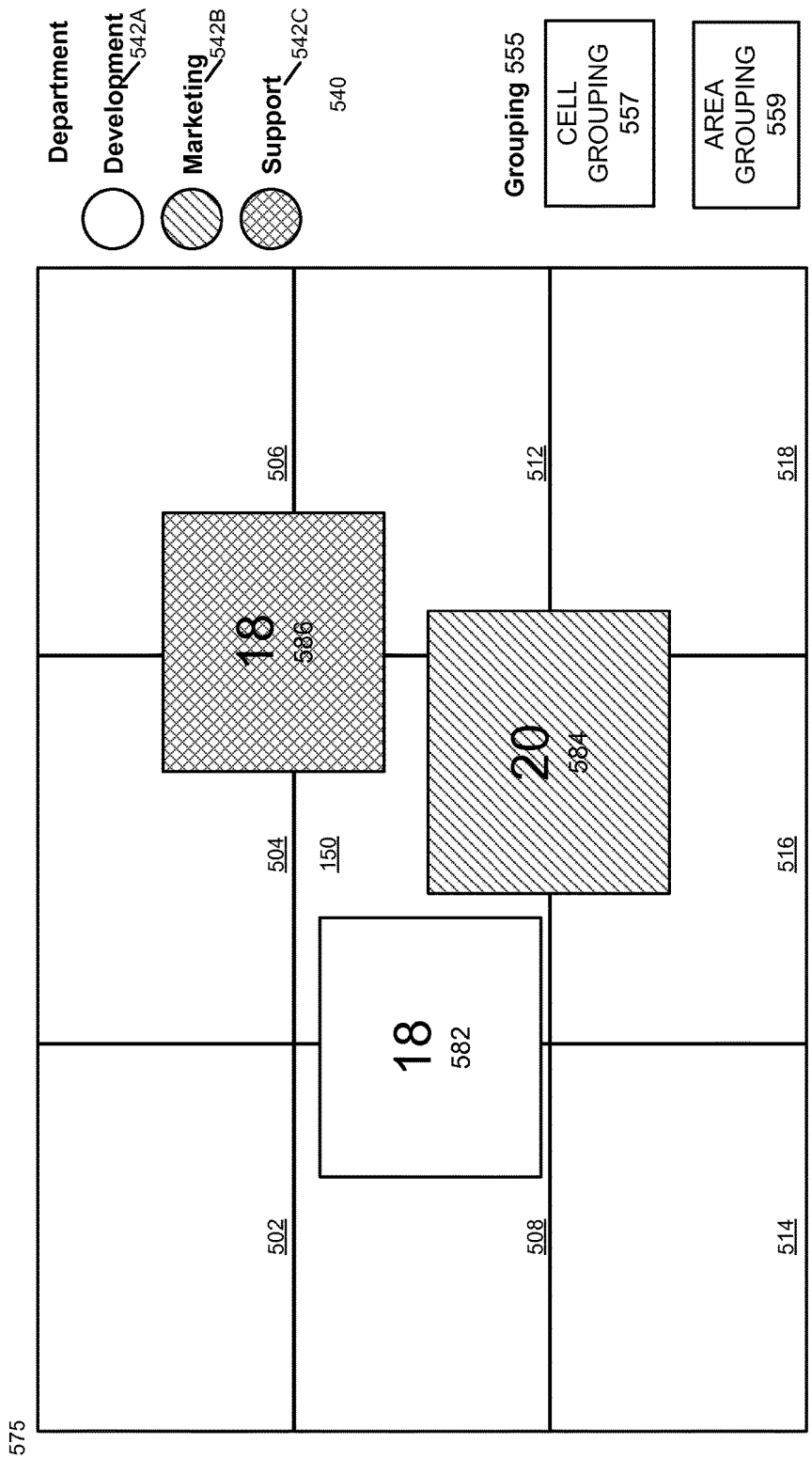

Embodiments of the invention also provide dynamic grouping functionality enabling users to group icons representing data entities in each cell or across multiple cells according to one or more additional attribute values. FIGS. 5A-5C illustrate example grouping functionality in grid-based visualizations according to embodiments of the invention.

FIG. 5A illustrates an example grid-based visualization 500 partitioned into three rows and three columns, forming cells 502, 504, 506, 508, 510, 512, 514, 516, and 518; however, embodiments of the invention may be utilized with any arbitrary number of cells arranged into any possible combination of rows and columns.

Each of the cells 502-518 optionally contains a set of icons, such as cells 502, 504, 506, 508, 510, 512, 514, 516, and 518 include icon sets 520, 522, 524, 526, 528, 530, 532, 534, and 536, respectively. Each of the icons represents a data entity, for example a record of an employee or product, and each cell may include zero or any arbitrary number of icons. Users may select, move, or otherwise interact with icons to reveal additional information and/or manipulate attributes of the corresponding data entity. Additionally, users may drag icons from one cell to another to change the corresponding data entity's attribute values to match those assigned to the destination cell.

In an embodiment, the horizontal and vertical axes of the grid-based visualization 500 are assigned to different attributes of the data entities, and each cell represents a pair or range of values for these two attributes. For example, the horizontal axis may be assigned to a measure of employee performance and the vertical axis may be assigned to a measure of employee ability. In this example, each grid cell represents a specific pair of attribute values or a range of values for these two attributes. In this example, each icon corresponds to a data entity representing an employee record. As described above, embodiments of the grid-based visualization 500 may dynamically size icons and include selecting zooming and overflow functions.

In addition to the two attributes assigned to the horizontal and vertical axes of the grid-based visualization, example grid-based visualization 500 also shades each icon according to one or more additional attribute values. For example, each icon is shaded, patterned, and/or colored based on the corresponding employee's department. A legend 540 includes entries 542A, 542B, and 542C indicating the color, pattern, and/or shading representing the Development, Marketing, and Support departments, respectively. Thus, in this example, the grid-based visualization 500 displays at least three attributes of the data entities: the performance, ability, and department of each employee.

Embodiments of the invention also include dynamic grouping functionality that enables users to group icons according to attribute values to view aggregate characteristics of the data set. FIG. 5B illustrates a first example grouping 550 applied to the example grid-based visualization 500 according to an embodiment of the invention. For each cell of the grid-based visualization, example grouping 550 replaces individual icons with summary icons. Each summary icon represents a unique tuple of attribute values. In this example grouping 550, each summary icon represents a tuple including the values of the two attribute dimensions of a cell as the employee department of one or more icons in that cell. Because there are three departments in the example grid-based visualization 500, the example grouping 550 may include up to three summary icons in each cell. In general, summary icons may be displayed for each combination of attribute values of the data entities displayed in a grid-based visualization.

Each summary icon may display one or more aggregate attributes of the group of icons it represents. In example grouping 550, for example, each summary icon displays the total number of icons (and hence data entities) that it represents. For example, cell 502 include two icons associated with the development department and one icon associated with the marketing department. Thus, in FIG. 5B, cell 502 in grouping 550 includes summary icon 544A shaded to indicate its association with the development department and including the numerical indicator "2." This indicates that summary icon 544A is a grouping of two development icons from the ungrouped grid-based visualization 500. Similarly, cell 502 also includes summary icons 546A and 548A, representing groupings of one marketing icon and two support icons from the ungrouped grid-based visualization 500, respectively. The other cells in the grouping 550 also include one or more summary icons, each one representing one or more icons from the ungrouped grid-based visualization 500 and displaying numerical indicators of their group size.

In a further embodiment, if there are no icons matching a given combination of tuple values for a cell, then the corresponding summary icon may be omitted from the grouping. For example, cell 508 in grouping 550 includes summary icons 544B and 548B, representing the development and support departments. However, cell 508 does not include a summary icon representing the marketing department, as there are no icons associated with that department in cell 508 in grid-based visualization 500.

In the example grouping 550, each cell includes summary icons representing the set of icons in that cell matching a given category (if any). In further embodiments of the invention, icons from two or more cells can be grouped under a single summary icon. For example, icons from the same row, column, the entire visualization, or any arbitrary selection of cells may be grouped under the same icons.

FIG. 5C illustrates a second example grouping 575 according to an embodiment of the invention. In this example grouping 575, icons associated with the same department and located in any of the cells are grouped under a single summary icon. Example grouping 575 includes summary icons 582, 584, and 586, representing icons from any cell associated with the development, marketing, and support departments, respectively.

In a further embodiment, summary icons may be positioned to provide additional information to users. Example grouping 575 positions summary icons 582, 584, and 586 at positions based on a weighted average of the positions of the icons in that grouping. In a yet further embodiment, while positions of individual icons within a grid cell may carry no information, summary icons (582, 584, 586) representing individual icons from multiple grid cells are positioned based on averaged metric values of the individual icons, such as an average of their attribute values related to the grid visualization's first axis and/or an average of their attribute values related to the grid visualization's second axis.

Additional embodiments of the invention may visualize groupings of icons in the form of icons, symbols, text, numbers, images, charts (e.g. bar chart, pie chart, treemap), or any other type of visual indicator. In still other embodiments, the size of the summary icon is based on the number of icons it replaces.

Embodiments of the invention can enable groupings of icons, such as grouping 550, using any type of user input and optionally any type of graphical user interface element. For example, grouping control 555 includes a button 557 for enabling and disabling grouping on a per cell basis, as shown in FIG. 5B, and a button 559 for enabling and disabling grouping across multiple cells, as shown in FIG. 5C.

In still a further embodiment, the legend 540 associated with grid-based visualization 500 is used as a graphical user interface control to enable groupings and optionally filter out categories of icons. For example, by selecting one or more of the categories 542A-542C in legend 540 in FIG. 5A, 5B, or 5C, a user can add or remove all of the data entity icons or summary icons associated with that category.

FIGS. 5A-5C illustrate example groupings with respect to a single attribute value, in addition to the attributes associated with the grid-based visualization axes. However, embodiments of the invention may be applied to group icons according to multiple attributes.

Embodiments of example groupings 550 and 575 may also allow users to select any summary icon to view additional information about that group and/or the individual icons that it represents.

Figure 6:
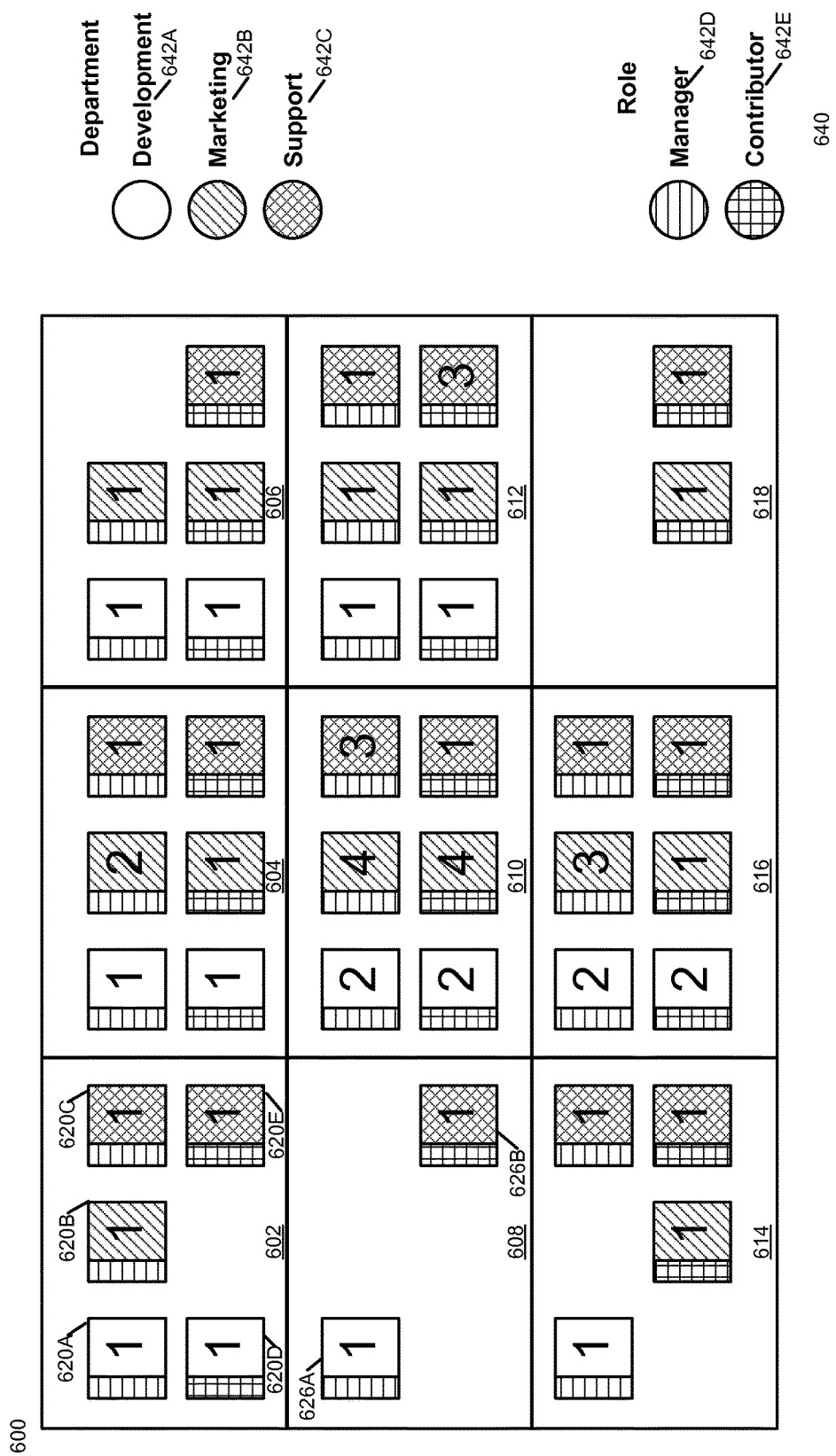
FIG. 6 illustrates an example multi-attribute grouping in a grid-based visualization according to an embodiment of the invention.

FIG. 6 illustrates an example multi-attribute grouping 600 in a grid-based visualization according to an embodiment of the invention. Example grouping 600 is a multi-attribute grouping of the grid-based visualization 500 in FIG. 5A. Example grouping 600 includes cells 602, 604, 606, 608, 610, 612, 614, 616, and 618. A legend 640 specifies the color, shading, and/or pattern applied to summary icons based on their values for two attributes: department and role. In example 600, the department attribute may have the value of development 642A, marketing 642B, or support 642C, and the role attribute may have the value of manager 642D or contributor 642E.

With these two attributes, each cell in example grouping 600 may have up to six summary icons, each representing one of the six possible combinations of these two attribute values. For example, cell 610 includes summary icons 628A-628F representing all possible value combinations of these two attributes. If there are no icons matching a given combination of tuple values for a cell, then the corresponding summary icon may be omitted from the grouping. For example, cell 608 in example grouping 600 includes only summary icons 626A and 626B, representing a development manager and a support contributor, as the corresponding ungrouped cell does not include any data entity icons having other combinations of attribute values.

In an embodiment, each summary icon is shaded in two or more sections to indicate its association with each category. Additional embodiments of the invention may visualize groupings of icons in the form of icons, symbols, text, numbers, images, charts (e.g. bar chart, pie chart, treemap), or any other type of visual indicator. In still other embodiments, the size of the summary icon is based on the number of icons it replaces.

As shown in example 600, embodiments of the multi-attribute grouping may be applied within each cell separately. Further embodiments of the invention may provide multi-attribute grouping across multiple cells, similar to that shown in FIG. 5C, except that each summary icon represents a group of icons with two or more attribute values in common. Embodiments of the multi-attribute grouping may also include any combination of the functions and interactions associated with other grid-based visualization discussed above, including drag-and-drop manipulation of data entity attributes via corresponding icons; user selection, movement, and other interactions to reveal additional information and/or manipulate attributes of the corresponding data entity; selective zooming on rows, columns, or one or more cells in the grid-based visualization; and dynamic icon sizing, overflow indicators, and/or scrolling within cells.

Figure 7:
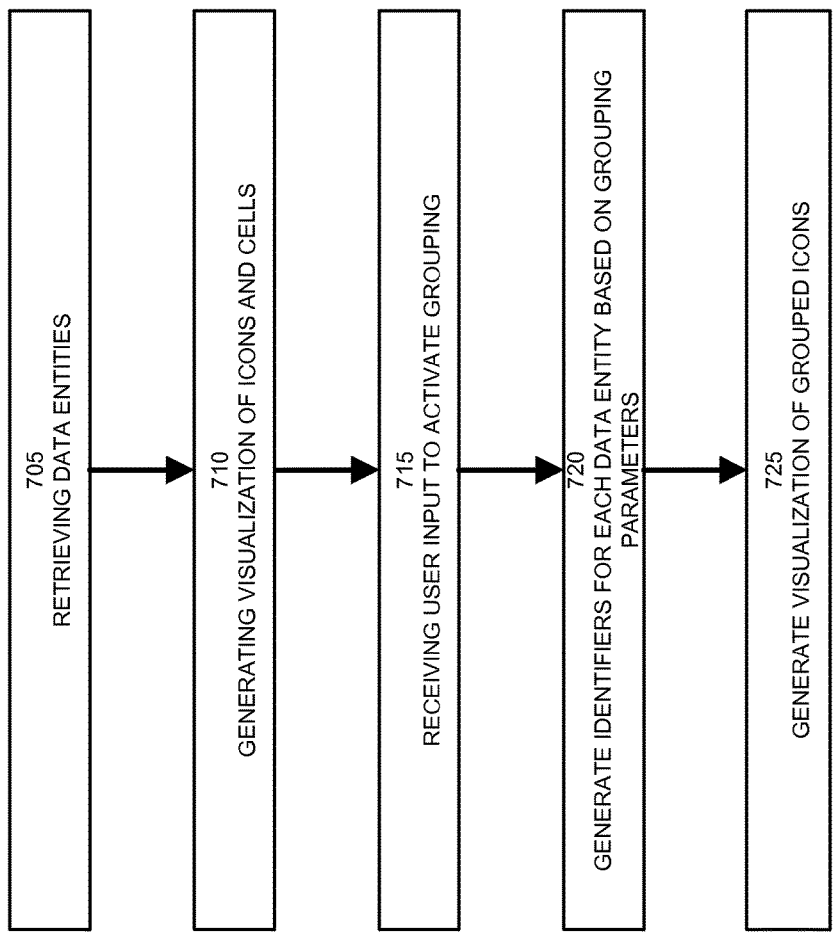
FIG. 7 illustrates a method of grouping icons according to one or more attributes in a grid-based visualization according to an embodiment of the invention.

FIG. 7 illustrates a method 700 of grouping icons according to one or more attributes in a grid-based visualization according to an embodiment of the invention. Step 705 retrieves one or more data entities to be displayed in a grid-based visualization. In an embodiment, step 705 retrieves data entities from a database or other data storage system. Step 705 may retrieve data entities matching criteria specified by a user and/or a visualization application. In one embodiment, step 705 retrieves data entities matching criteria for any cell in the grid-based visualization, and then assigns each data entity to a cell based on two or more data entity attribute values associated with the dimensions of the grid-based visualization. In another embodiment, step 705 retrieves data entities using criteria or database queries specific to each cell of the grid-based visualization.

Step 710 generates a grid-based visualization including cells arranged in rows and columns and icon sets representing data entities. Step 710 may also generate other user interface elements, such as selective zoom controls, legends, and filter controls. In an embodiment, step 710 may specify the size of icons and their arrangement within cells in a manner similar to method 400 described above. In a further embodiment, step 710 assigns color, shading, patterns, and/or any other visual attributes to icons based on the value of one or more additional attributes.

In an embodiment, step 710 generates markup language code, styling elements, scripting code, data corresponding with attributes of the data entities, and any other content assets required to display and optionally enable user interaction with the grid-based visualization. This embodiment then forwards this generated code and data to a client application for processing to implement and display the grid-based visualization. In an example of this embodiment, the generated code and data may include web markup, code, and other content assets adapted to be displayed on a client web browser. In another embodiment, step 710 displays the grid-based visualization to users and implements the user interface.

Step 715 receives a user input activating a grouping with cells or across cells. In an embodiment of method 700, step 720 generates an identifier for each data entity based on one or more of its attribute values. Step 720 assigns data entities to groups based on their identifier values, and then determines any aggregate attribute values of the group, such as the number of data entities assigned to it. Step 720 determines the position, size, color, shading, patterning, and/or any other visual attributes of the summary icons based on the size of each group, the categories that they represent, and (depending on the type of grouping) the positions of the icons that they replace.

Step 725 then generates the visualization of the grouped icons. Step 725 may be performed in a manner similar to that described for step 710 above.

Figure 8:
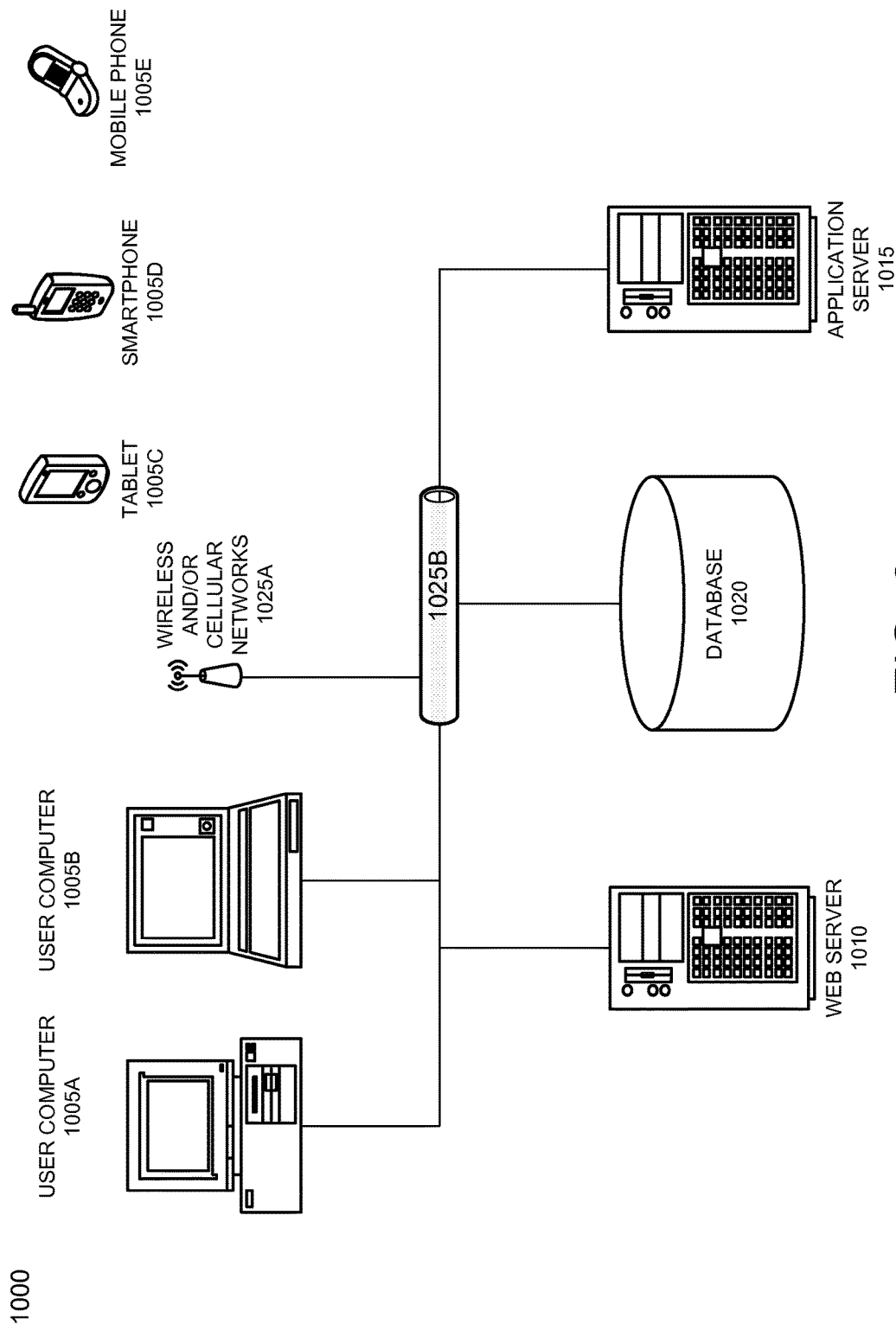
FIG. 8 illustrates a computer system suitable for implementing embodiments of the invention.

FIG. 8 illustrates a computer system suitable for implementing embodiments of the invention. Embodiments of the invention may be implemented as standalone applications or as web-based applications implemented using a combination of client-side and server-side code. The system includes user computers 1005 including desktop 1005A and portable personal computers 1005B, tablets 1005C, smartphones 1005D, and mobile phones 1005E. The system can interface with any type of electronic device, such as a thin-client computer, Internet-enabled mobile telephone, mobile Internet access device, tablet, electronic book, or personal digital assistant, capable of displaying and navigating web pages or other types of electronic documents and/or executing applications. Although the system 1000 is shown with five user computers, any number of user computers can be supported.

A web server 1010 is used to process requests from web browsers and standalone applications for web pages, electronic documents, enterprise data or other content, and other data from the user computers. The server may also provide push data or syndicated content, such as RSS feeds, of data related to enterprise operations.

Application server 1015 operates one or more applications. The applications can be implemented as one or more scripts or programs written in any programming language, such as Java, C, C++, C#, or any scripting language, such as JavaScript or ECMAScript, Perl, PHP, Python, Ruby, or TCL. Applications can be built using libraries or application frameworks, such as Rails, Enterprise JavaBeans, or .NET. Web content can be created using HTML, CSS, and other web technology, including templating languages and parsers.

The data applications on application server 1015 process input data and user computer requests and can store or retrieve data from database 1020. Database 1020 stores data created and used by the data applications. In an embodiment, the database 1020 is a relational database that is adapted to store, update, and retrieve data in response to SQL format commands or other database query languages. In other embodiments, unstructured data storage architectures and NoSQL databases may also be used.

In an embodiment, the application server 1015 is one or more general-purpose computers capable of executing programs or scripts. In an embodiment, the web server 1010 is implemented as an application running on one or more general-purpose computers. The web server and application server may be combined and executed on the same computers.

An electronic communication network 1025 enables communication between user computers 1005, web server 1010, application server 1015, and database 1020. In an embodiment, network 1025 may further include any form of electrical or optical communication devices, including wireless 1025A and wired 1025B networks. Network 1025 may also incorporate one or more local-area networks, such as an Ethernet network; wide-area networks, such as the Internet; and cellular carrier data networks; and virtual networks, such as a virtual private network.

The system is one example for executing applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. Any suitable programming language can be used to implement the routines of particular embodiments. Any type of programming techniques may be employed including procedural, functional, and/or object oriented programming techniques. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a tangible computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for manipulating a grid visualization in a computing system including a processor coupled to a user input and to a display, the method comprising operations performed by the processor as follows:
    receiving content assets for display in the computing system, the content assets including definitions for data entities from a data set;
    displaying the grid visualization including at least a first axis associated with a first attribute and one or more attribute values, a second axis associated with a second attribute and one or more attribute values, and a first grid cell representing a first attribute value related to the first axis and a second attribute value related to the second axis;
    populating the first grid cell with one or more individual icons representing the data entities from the data set, wherein each data entity is associated with the first attribute value, the second attribute value, a third attribute value for a third attribute and a fourth attribute value for a fourth attribute, and wherein the one or more individual icons are equally sized and as large as possible given a size of the first grid cell;
    displaying an overflow indicator within the first grid cell when a part of the one or more of the individual icons cannot be displayed within the size of the first grid cell;
    receiving a first user input from a user input device to drag and drop an icon across a display screen from the first grid cell to a second grid cell;
    upon receiving the first user input updating at least one attribute of the icon from a value associated with the first grid cell to a value associated with the second grid cell;
    receiving a second user input from the user input device to initiate a grouping of the one or more individual icons;
    upon receiving the second user input, assigning portions of the one or more individual icons to groups based on the third attribute value and the fourth attribute value; and
    replacing a first portion of the one or more individual icons with at least one chart including icons from at least one of the groups, wherein the at least one chart includes one or more of a bar chart, pie chart or treemap.

2. The method of claim 1, wherein assigning the portions of the one or more individual icons to the groups comprises:
    generating identifiers for each of the one or more individual icons based on its third and fourth attribute values; and
    assigning the one or more individual icons to the groups based on their identifiers.

3. The method of claim 1, wherein each group includes a portion of the one or more individual icons having matching third attribute values and fourth attribute values.

4. The method of claim 1, wherein:
    the one or more individual icons include first visual indicators of their third attribute value and fourth attribute value; and
    a summary icon includes a second visual indicator of the third and fourth attribute values of the portion of the one or more individual icons it represents.

5. The method of claim 4, wherein the second visual indicator includes at least one of an icon, a text, a number, an image, a symbol, a chart, or other visual information.

6. The method of claim 1, comprising:
    determining a number of individual icons assigned to each group.

7. The method of claim 6, wherein the at least one chart is sized dynamically.

8. The method of claim 1, comprising:
    displaying a legend based on the third attribute and the fourth attribute and at least a part of the attribute values associated with the one or more individual icons.

9. The method of claim 8, comprising:
    receiving a third user input selecting a portion of the legend; and
    upon receiving the third user input, filtering a plurality of charts based on an attribute value associated with the portion of the legend.

10. The method of claim 1, comprising:
    positioning the at least one chart based on positions of the first portion of the one or more individual icons.

11. A method for manipulating a grid visualization in a computing system including a processor coupled to a user input and to a display, the method comprising operations performed by the processor as follows:
    receiving content assets for display in the computing system, the content assets including definitions for data entities from a data set;
    displaying the grid visualization including at least a first axis associated with a first attribute and one or more attribute values, a second axis associated with a second attribute and one or more attribute values, a first grid cell representing a first attribute value related to the first axis and a second attribute value related to the second axis and a second grid cell representing a third attribute value related to the first axis and a fourth attribute value related to the second axis;

populating the first grid cell with a first set of one or more individual icons representing data entities from the data set, wherein each data entity is associated with the first attribute value, the second attribute value, and a fifth attribute value for a third attribute, and wherein the one or more individual icons in the first set are equally sized and as large as possible given a size of the first grid cell;

populating the second grid cell with a second set of one or more individual icons representing data entities from the data set, wherein each data entity is associated with the third attribute value, the fourth attribute value, and a sixth attribute value for the third attribute, and wherein the second set of one or more individual icons are equally sized and as large as possible given a size of the second grid cell;

displaying an overflow indicator within the first grid cell when one or more of the individual icons of the first set cannot be displayed within the size of the first grid cell;

receiving a first user input from a user input device to initiate a grouping of the first set and the second set;

upon receiving the first user input, assigning the first set and the second set to groups based on their attribute values for the third attribute, wherein each group is associated with an attribute value for the third attribute;

replacing the first set and the second set with a display of at least one chart including icons from at least one of the groups, wherein the at least one chart includes one or more of a bar chart, pie chart or treemap; and positioning the at least one chart over parts of both the first grid cell and the second grid cell.

12. The method of claim 11, wherein assigning the first set and the second set to groups comprises:

generating identifiers for each the first set and the second set based on its attribute values for the third attribute; and assigning the first set and the second set to the groups based on their identifiers.

13. The method of claim 11, wherein each group includes a portion of the first set and the second set having matching attribute values for the third attribute.

14. The method of claim 11, wherein:

the first set and the second set include first visual indicators of their attribute values; and one or more summary charts include a second visual indicator of the first attribute values of the first set and third attribute values of the second set.

15. The method of claim 14, wherein the second visual indicator includes at least one of an icon, a text, a number, an image, a symbol, a chart, or other visual information.

16. The method of claim 14, comprising:

determining a number of icons in the first set assigned to each group and a number of icons in the second set assigned to each group.

17. The method of claim 16, wherein the one or more summary charts are sized based on the number of icons in the first set assigned to its group and on the number of icons in the second set assigned to its group.

18. The method of claim 11, comprising:

displaying a legend based on the third attribute and at least a part of the attribute values associated with the first set and the second set.

19. The method of claim 18, comprising:

receiving a second user input selecting a portion of the legend; and upon receiving the second user input, filtering the one or more summary charts based on an attribute value associated with the portion of the legend.

20. A tangible, non-transitory computer-readable data storage medium including instructions adapted to direct a processor coupled to a user input and to a display to perform operations comprising:

receiving content assets for display in a computing system, the content assets including definitions for data entities from a data set;

displaying a grid visualization including at least a first axis associated with a first attribute and one or more attribute values, a second axis associated with a second attribute and one or more attribute values, and a first grid cell representing a first attribute value related to the first axis and a second attribute value related to the second axis;

populating the first grid cell with one or more individual icons representing data entities from a data set, wherein each data entity is associated with the first attribute value, the second attribute value, and a third attribute value for a third attribute and a fourth attribute value for a fourth attribute, and wherein the one or more individual icons are equally sized and as large as possible given a size of a first grid cell;

displaying an overflow indicator within the first grid cell when a part of the one or more of the individual icons cannot be displayed within the size of the first grid cell;

receiving a first user input from a user input device to drag and drop an icon from the first grid cell to a second grid cell;

upon receiving the first user input updating at least one attribute of the icon from a value associated with the first grid cell to a value associated with the second grid cell;

receiving a second user input from the user input device to perform initiating a grouping of the one or more individual icons;

upon receiving the second user input, assigning the one or more individual icons to groups based on their attribute values for the third attribute and the fourth attribute; and replacing the one or more individual icons with a display of at least one chart including icons from at least one of the groups, wherein one of the at least one chart includes one or more of a bar chart, pie chart or treemap.

* * * * *